United States Patent [19]

Leiber et al.

[11] Patent Number: 4,824,185

[45] Date of Patent: Apr. 25, 1989

[54] HYDRAULIC DUAL-CIRCUIT BRAKING SYSTEM

[75] Inventors: Heinz Leiber, Oberriexingen; Walter Klinker; Manfred Steiner, both of Stuttgart, all of Fed. Rep. of Germany

[73] Assignee: Daimler-Benz Aktiengesellschaft, Stuttgart, Fed. Rep. of Germany

[21] Appl. No.: 220,595

[22] Filed: Jul. 18, 1988

[30] Foreign Application Priority Data

Jul. 18, 1987 [DE] Fed. Rep. of Germany ....... 3723917

[51] Int. Cl.$^4$ .............................................. B60T 8/44
[52] U.S. Cl. ................................... 303/110; 303/100; 303/108
[58] Field of Search ................... 303/97, 98, 99, 100, 303/103, 106, 108, 110, 111, 114; 364/426

[56] References Cited

U.S. PATENT DOCUMENTS

| | | | |
|---|---|---|---|
| 4,714,299 | 12/1987 | Takata et al. | 303/100 |
| 4,749,239 | 6/1988 | Onogi et al. | 303/100 X |
| 4,778,224 | 10/1988 | Leiber | 303/114 |

FOREIGN PATENT DOCUMENTS

| | | |
|---|---|---|
| 2453573 | 5/1976 | Fed. Rep. of Germany . |
| 3301948 | 7/1984 | Fed. Rep. of Germany . |
| 3440541 | 5/1986 | Fed. Rep. of Germany . |

Primary Examiner—Duane A. Reger
Attorney, Agent, or Firm—Barnes & Thornburg

[57] ABSTRACT

A hydraulic dual-circuit braking system comprising two main cylinders combined in twin-type construction which is actuated via a torque-equalized rocker operated by an actuating force proportional to brake pedal force, and wherein the main cylinders have position transmitters to detect piston positions, which are indirectly a measure of the brake pressure, and wherein an anti-blocking system enables the front wheel brakes to be blocked off from their main cylinders. The position signals are used by an electronic processing unit to determine the instantaneous front axle/rear axle braking force distribution, and compares this with a value which is ideal in accordance with the vehicle data, and when this comparison shows that the rear axle braking force component is too low, the front-wheel brakes are blocked off from their main cylinders until the rear axle braking force component is increased to such an extent that the ideal braking force distribution has been almost achieved. The front wheel blocking is then halted and both braking forces increase until the next under comparison situation is reached. The cycle of operation is then repeated.

17 Claims, 4 Drawing Sheets

HYDRAULIC DUAL-CIRCUIT BRAKING SYSTEM

BACKGROUND AND SUMMARY OF THE INVENTION

The invention relates to a hydraulic dual-circuit braking system for a road vehicle having front wheel and rear wheel brakes which are controlled by a front axle and a rear axle braking circuit means I and II.

A supply of braking pressure is provided which is provided by pedal force and, if necessary, provided using a braking force amplifier. Each of the braking circuits includes a static main cylinder, each arranged adjacent to one another in a twin-type of construction in a common housing. The pistons of each cylinder are mounted for displacement by one arm of a rocker displaced by the possibly amplified pedal force. The rocker is pivotable about an axis which extends vertically with respect to this direction of displacement of the pistons, and has rocker arms $L_V$ and $L_H$, the ratio of which corresponds to the ratio of forces applied to the front and rear brakes. The pedal forces provide for a dynamically stable braking behavior of the vehicle in an entire range of vehicle decelerations.

The braking system also is provided with an electronic anti-blocking system (ABS) which, in response to the position of the front and rear main brake piston, provides a blocking of the pressure actuating force to the front and rear brakes. Such a braking system is the subject matter of German Unexamined Patent Application No. P 37 00 697.5-21.

In the braking device, the ratio $L_V/L_H$ of the effective lengths $L_V$ and $L_H$ of the rocker arms, which are supported at one end of the pistons of the front axle main cylinder and of the rear axle main cylinder, respectively, are equal to the ratio $F_H/F_V$ of the effective piston areas $F_H$ and $F_V$ of the respective main cylinder pistons. As a result, identical displacement distances of the pistons, in the sense of a pressure build-up, are also linked to identical outlet pressures in the output pressure spaces of the two main cylinders. The resultant installed braking force distribution corresponds to a permanent balancing of the braking force ratio $F_{VA}/F_{HA}$. This permanent balancing of the installed braking force distribution is arranged in such a manner that a stable dynamic braking behavior of the vehicle is obtained in the entire range of variations of the possible braking forces of vehicle decelerations. This design of the braking device enables the latter to be utilized in a simple manner with an anti-blocking system, which operates in accordance with the principle of volume expansion of the output pressure spaces of the main cylinders.

Although this design of the braking system is very advantageous: with respect to the implementation of the anti-blocking control functions; with respect to the safeguarding against a failure of one of the braking circuits, in which case the other braking circuit can still be braked with braking force amplification; or with disturbance of the braking force amplifier, in which case adequate braking deceleration can be achieved via both braking circuits with the pedal force alone, it has the disadvantage that, because of the permanent balancing of the brake force distribution in its entire range of variation, the rear wheel brakes make only a relatively small contribution to the total braking force, compared with an ideal braking force distribution, in the part-braking range. The consequence of this is that the front wheel brakes, because they have to generate the predominating part of the braking force utilized, must be dimensioned to be very much stronger than the rear wheel brakes, which creates considerable problems with respect to the constructional size of the front wheel brakes, particularly in high-power vehicles. Furthermore, the front wheel brakes are also subject to much greater wear than the rear wheel brakes. In the part braking range of interest, an increased contribution of the rear wheel brakes to the braking force can be utilized when the vehicle is equipped with an anti-blocking system, by providing a brake pressure control, and utilizing functional elements of the anti-blocking system to such an extent that the rear wheel brake slip is adjusted to a value which, as long as the anti-blocking system has not responded, is always slightly greater than the front wheel brake slip. However, a very accurate monitoring of the brake slip, both of the front wheels and of the rear wheels, is required which, in order to be implemented, requires severe changes in an electronic control unit of the ABS which is also utilized for controlling the braking pressure distribution, thus requiring extensive technical alterations. An additional problem is that a braking force distribution control system operating in accordance with the principle of brake slip monitoring ASB in the above sense, operates with adequate accuracy only above a minimum speed of the vehicle which is about 30 km/h.

It is therefore the object of the present invention to improve a braking system of the type initially mentioned, by means of advantageously little technical expenditure, a front axle/rear axle braking force distribution can also be achieved with a braking system not subject to anti-blocking control, which enables an increased rear axle braking force component to be utilized in the part braking range without a loss of dynamic stability of the vehicle.

According to the present invention, this object is achieved by having position transmitters to indicate the positions of the front and rear main brake cylinders and to input these into an electronic control. The control calculates an ideal front and rear wheel braking force ratio ($F_V/F_H$), correlated to a particularly desired deceleration, and compares this to the actual called for braking forces. When the value of the actual rear braking force is lower by more than a threshold value $F_{HA1}$ than the ideal value $F_{HAi}$, the electronic control blocks any actuating pressure change to the front brake from the front main cylinder, while allowing increases to the actuating pressure for the rear brakes, until the rear brake force approaches the ideal force by a second and lesser threshold value $F_{HA2}$, at which time the blocked pressure at the front brakes is released to allow both brake actuating pressure forces to respond to the brake pedal input.

Accordingly, each of the two main cylinders of the braking device is provided with an electric inductive position transmitter which emits an electric output signal characteristic of the respective piston position. Because of the relationship between piston position and braking pressure, which, although it is non-linear in the range of relatively low braking pressures and overall is monotonic and thus unambiguous, these signals are also a measure of the actuating braking pressure, and thus also a measure of the front axle braking force $F_{VA}$ and the rear axle braking force $F_{HA}$. They are supplied as information inputs to a processing unit which detects from them the current braking force of the desired deceleration force distribution. This processing unit compares the actual called for rear axle braking force component with the ideal value, referred to the respective front axle braking force component, which ideal value corresponds to equal force closure utilization at the front axle and the rear axle brakes. If this comparison shows that the current value of the rear axle braking force component, determined by means of the position transmitter of the rear axle main cylinder, is less by more than a difference threshold $\Delta F_{HA1}$ of, for example, 15% to 20% than the ideal value $F_{HAi}$, the processing unit generates a signal which in turn triggers the actuation of the braking pressure control valves of the front wheel brakes to their blocking position. After that, an increase in operating force initially only causes the rear axle braking force component to be increased as a result of which the braking force distribution develops to the ideal value $F_{HAi}$ of the rear axle braking force logically combined with the current value of the front axle braking force component. If, during this process, the rear axle braking force component reaches a value which is less by less than a second difference threshold $\Delta F_{HA2}$, the amount of which is less than the first-mentioned threshold and which is about 5%, than the ideal value $F_{HAi}$, the processing unit generates a signal which triggers the switching back of the braking pressure control valves of the front axle braking circuit into their basic open position. Due to the automatically controlled repetition of such braking force distribution control cycles, a step or sawtooth-shaped approximation of the actually utilized braking force distribution to the ideal braking force distribution is achieved. The rear axle braking force component being less by at least the difference amount $\Delta F_{HA2}$ and at the most by the difference amount $\Delta F_{HA1}$ than the ideal value in each case. The front wheel brakes are less loaded because of the more effective utilization of the rear wheel brakes which benefits both in a reduction in wear and in operating reliability. On the other hand, the front wheel brakes can be dimensioned to be slightly smaller, compared with a vehicle without the braking force distribution control which has constructional advantages with respect to the accommodation of the front wheel brakes.

If the relationship between piston position and initial pressure of the main cylinders is known, it is possible to calibrate the output signals of both position transmitters in a simple manner in units of pressure, and also the respective braking force component and the venting condition can also be separately checked for each of the two braking circuits. This calibration is obtained with the vehicle being stationary and the operating brake pressure exceeding a threshold value $P_0$, wherein a comparison of the actual pressure of the front and rear main brake cylinders with respect to these sensed positions are calculated.

If the displacement distance, detected by means of the respective position transmitter, of a piston to the response of the pressure switch is only slightly greater than the minimum value logically combined with the optimum venting condition of the braking system, this difference is taken into consideration in the sense of a correction by the processing unit. In principle, this relies on the fact that, from the difference between the measured and the ideal value, a correction factor is formed which corresponds to the ideal value/measurement value ratio, so that the ideal value can be used for further processing. The correction is achieved by multiplying the measured value by the correction value. If the measured displacement distance of the respective main cylinder piston is large (greater by more than a difference amount which forms a tolerance threshold than the ideal value), this is an indication of the fact that the degree of venting in the respective braking circuit is too defective, and that the braking system must undergo maintenance. This is indicated to the driver by means of a visual and/or audible warning signal. The permanently balanced braking force distribution is detected and checked by measuring the piston positions or brake pressures, respectively, in the output pressure spaces of the main cylinders with a predetermined pressure $P_O$ in a braking force distribution diagram.

Since the ideal braking force distribution in a vehicle is not only dependent on the vehicle geometry but also on the loading condition of the vehicle, particularly on the load distribution in the vehicle, it is advantageous if the actual braking force components are taken into consideration in the calculation of the ideal braking force distribution in order to be able to achieve a most effective utilization of the rear axle braking force component by means of the braking force distribution control system according to the invention.

Also, it is desirable if the threshold value is lowered in accordance with respect to transverse forces acting on the vehicle which, in practice, lead to different ideal braking force distributions having to be stipulated for the lefthand vehicle side and the righthand vehicle side.

Vehicle loading and weight distribution of the vehicle can be obtained in response to the static load condition of the vehicle spring suspension, and this can be used for determining the total vehicle weight and the weight distribution of the vehicle. Such sensors can be constructed, for example, as spring travel transmitters which enable the wheel loads to be detected or also as inclination transmitters which respond to a longitudinal or transverse inclination of the vehicle.

As an alternative to this or in combination with this, the total vehicle weight and axle load distribution can also be determined by utilizing the operating data of the vehicle, namely: engine speed, throttle value position and gear transmission for transmitting torque (sensed in the drive shaft of the vehicle). Alternatively, changes in vehicle acceleration and braking forces causing the same can be utilized In this connection, the measuring accuracy can be considerably increased by forming a mean value over the results of several individual dynamic measuring processes.

Other objects, advantages and novel features of the present invention will become apparent from the following detailed description of the invention when considered in conjunction with the accompanying drawings.

DETAILED DESCRIPTION OF THE DRAWINGS

Figure 1:
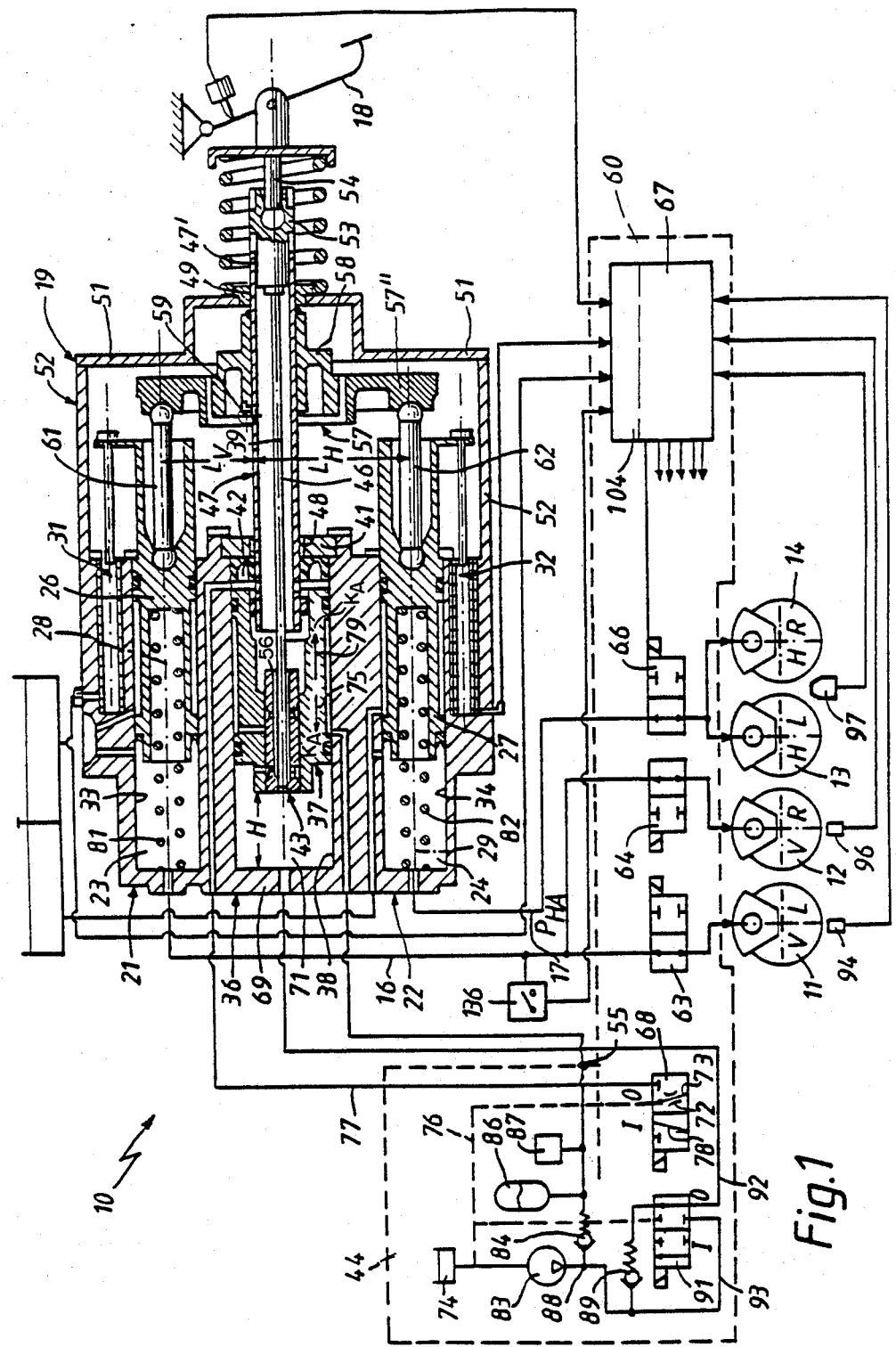
FIG. 1 shows a first illustrative embodiment of a dual-circuit braking system according to the invention, in which the braking force distribution control is effected by intermittently blocking the braking pressure control valves of the front axle braking circuit, in a simplified diagrammatic block diagram representation.

A braking system 10 is shown which is constructed as hydraulic dual-circuit braking system, the front wheel brakes 11 and 12 of which are combined to form a front axle braking circuit I, and the rear wheel brakes 13 and 14 of which are combined to form a rear axle braking circuit II. These brakes are connected via main brake lines 16 and 17 to the pressure outputs of a braking device 19 associated with the braking circuits I and II, which braking device 19 can be actuated by means of a brake pedal 18.

The braking circuits I and II are constructed as static braking circuits which are loaded with pressure by providing, within the framework of the braking device 19, one main cylinder for each circuit (designated by 21 and 22), and which have an output pressure space 23 and 24, connected to the respective main brake line 16 and 17, and wherein braking pressure can be statically built up and reduced by the pedal-power-controlled displacement of main cylinder piston 26 and 27, respectively.

The braking device 19 is constructed in the so-called twin-type of construction, in such a manner that the two main cylinders 21 and 22 are arranged at a lateral distance next to one another with their central longitudinal axes 28 and 29 extending in parallel, as a result of which, compared with an otherwise usual tandem arrangement, a considerable reduction of the constructional length of the braking device 19, measured in the direction of these longitudinal axes 28 and 29, is achieved. This arrangement of the main cylinders 21 and 22 enables the respective positions of the main cylinder pistons 26 and 27, inside the cylinder bores 33 and 34, to be detected by means of position transmitters 31 and 32 of simple construction which will be discussed in greater detail in the text which follows.

A hydraulic braking force amplifier 36 is also integrated into the braking device 19 which provides an amplification of the actuating forces acting on the main cylinder pistons 26 and 27 by an amplification factor and in proportion to the control force exerted by the brake pedal 18 on the braking force amplifier 36.

The braking force amplifier 36 is constructed as linear hydraulic cylinder the piston 37 of which is displaceable longitudinally in a pressure-tight manner in a central housing bore 38, arranged between the housing bores 33 and 34 of the two main cylinders 21 and 22. The central longitudinal axis 39 of this hydraulic cylinder extends parallel to the central longitudinal axes 28 and 29 of the two main cylinders 21 and 22, and in the longitudinal center plane of the braking device 19 between these two axes 28 and 29. Between piston 37 and an internal partition 41 of the main cylinder is a drive pressure space 42 into which a control pressure, derived from the output pressure of an auxiliary pressure source 44, can be coupled by means of a proportional valve 43. The control pressure is proportional to the force with which the driver operates the brake pedal 18 and can be varied by the brake pedal 18 between zero and the maximum output pressure $P_A$ of the auxiliary-pressure source 14.

The proportional valve 43 is a slide valve, the valve slider of which is movement-coupled to the brake pedal 1 via a longitudinally extended control rod 46. Piston 37 is permanently connected to a longitudinally extending hollow piston rod 47 which passes through a central opening 48 of the partition 41 and is sealed against the latter and is additionally carried in an aligned opening 49 of the pedal-side cover 51 of the main cylinder and amplifier housing 52. This piston rod 47 has an end section 47' protruding from the housing, the axial length of which is at least and approximately equal to the maximum stroke H of the amplifier piston 37. At the pedal-side end, the hollow tube piston rod 47 is provided with a control piston 53 inserted in a pressure-tight displaceable manner, and engaged by the pedal plunger 54. This control piston 53 is permanently connected to the slider 56 of the proportional valve 43 through the control rod 46, which centrally passes through the hollow piston rod 47. The displacement distance of the control piston 53 relative to the hollow piston rod 47 is limited by axial steps to a small distance, which at least corresponds to the drive stroke of the proportional valve 43 and is approximately equal to this drive stroke.

To transmit the operating force developed by the braking force amplifier 36 to the main cylinder pistons 26 and 27, a rocker 57 is provided which is pivotably supported on a bearing block 58, which in turn is permanently connected to the piston rod 47. The axis of pivoting 59 of the rocker 57 extends perpendicular to the plane defined by the central axes 28 and 29 of the main cylinders 21 and 22, and is arranged eccentrically with respect to the central axis 39 of the braking force amplifier 36. The ratio $L_V/L_H$ of the effective lengths $L_V$ and $L_H$ of the rocker arms 57' and 57'', which are supported via axial plungers 61 and 62 on the pistons 26 and 27 of the main cylinders 21 and 23 associated with the front and rear axle braking circuits I and II, corresponds to the ratio $F_H/F_V$ of the effective piston areas $F_H$ and $F_V$ of the pistons 26 and 27, so that the same braking pressures occur with the same displacement distances of the pistons 26 and 27 of the two main cylinders 21 and 22 in their output pressure spaces 23 and 24, when the two braking circuits I and II are vented equally.

The output signals of the position transmitters 31 and 32, which are characteristic of the positions of the main cylinder pistons 26 and 27, are, at least in this case, a measure of the actuating brake pressures $P_{VA}$ and $P_{HA}$ prevailing in the output pressure spaces 23 and 24 of the main cylinders 21 and 22 and can therefore be evaluated in units of braking pressure if the relationship between piston position and output pressure $P_{VA}$ or $P_{HA}$ is known.

The terms "VA," "HA" and "VL," "VR" are used in conjunction with dimensional information or constructional and functional elements to indicate: the front axle, rear axle, the left front wheel, and the right front wheel of the vehicle, respectively.

The vehicle is also equipped with a normal anti-blocking system 60 (ABS) which, when it responds, provides a braking pressure control to the extent that the brake slip of the vehicle wheels which can be subjected individually or severally to the braking pressure control, maintained within a range of values which is compatible with good braking deceleration and also good driving stability.

This ABS 60 is designed in such a manner that, in addition to braking pressure reduction phases and braking pressure build-up phases, which are absolutely necessary for an effective control, braking pressure holding phases, at least on the front wheel brakes 11 and 12, can also be achieved for the duration of which a braking pressure previously set at the respective wheel brake, or achieved by the control, is kept constant.

In the special design of the ABS 60 shown in FIG. 1, braking pressure control valves 63 and 64 are provided for each of the two front wheel brakes 11 and 12, by means of which the front wheel brakes 11 and/or 12 can be individually or jointly blocked from the main braking line 16 of the front axle braking circuit I. In contrast, the rear axle braking circuit II has only a single braking pressure valve 66 by means of which the rear wheel brakes 13 and 14 can only be jointly connected to the main brake line 17 of the rear axle braking circuit II, or blocked from this line. The basic "0" position of these braking pressure control valves 63, 64 and 66 is the full-flow position in which the connected wheel brakes communicate via their respective valves to the output pressure spaces 23 and 24 of the front and rear axle main cylinders 21 and 22 of the braking device 19. In the excited "I" position, these valves 63 and/or 64 and 66 can be controlled by electric output signals of an electronic control unit 67 of the ABS 60, such that the wheel brakes 11 and/or 12 and 13 and 14 are blocked from the output pressure spaces 23 and 24 of the front and rear axle main cylinders 21 and 22. In their excited "I" position, the braking pressure control valves 63 and/or 64 and 66 thus provide the braking pressure holding function.

The ABS 60 is further provided with a function control valve 68, which is constructed as 2/3-way solenoid valve, which can be controlled from its basic "0" position shown, in which an actuating braking pressure build-up is possible at wheel brakes 11, and/or 12 and 13 and 14 when the associated braking pressure control valves 63 and/or 64 and 66 of which were held in their basic "0" position, are moved to an excited "I" position, in which a reduction of the braking pressure is possible at the wheel brakes 11, and/or 12, 13 and 14 which are hydraulically correspondingly switched.

A function space 71 is provided adjacent to and delimited by the amplifier piston 37 with respect to the drive pressure space 42 and is closed off to the outside in a fixed relationship with respect to the housing 52 by the end face wall 69 of the braking device 19. In the basic "0" position of this function control valve 68, the braking force amplifier 36 is connected via conduit 92 to a throughflow duct 73, provided with a throttle 72 of the function control valve 68 to the return line 76 leading to the pressureless storage container 74 of the auxiliary pressure source 44. Thus, the operating medium of the braking force amplifier 36 can be displaced from the function space 71 towards the storage container 74 of the auxiliary pressure source 44 by a displacement movement of the braking force amplifier piston 37, which displacement movement occurs in the sense of a braking pressure build-up in the main cylinders 21 and 22 so as to limit the braking process rate to a desired extent by the throttle 72 of the function control valve 68.

Both in the course of a normal braking pressure build-up phase (one which is not subject to the anti-blocking control) and during braking pressure build-up phases which occur during an anti-blocking control cycle and which may comprise: several pressure reduction, pressure holding and pressure build-up phases, the force $K_A$ acting on the brake amplifier piston 37 in the sense of a braking pressure build-up displacement movement in the direction of the arrow 75 of FIG. 1, is given by the relation $$K_A = (F_1 - F_2) \times P_{BKV}$$

Here $F_1$ designates the total cross-sectional area of the amplifier piston 37, which corresponds to the cross-sectional area of the housing bore 38 accommodating the amplifier piston 37; $F_2$ designates the total cross-sectional area of the piston rod 47, including its control piston 53 closing off its internal space towards the outside, corresponding to the cross-sectional area of the central bore 48 of the housing partition 41, and $P_{BKV}$ designates the pedal-force-proportional control pressure of the braking force amplifier 36 in the drive pressure space 42 obtained from the output pressure of the auxiliary pressure source 44 by means of the proportional valve 43.

In the excited "I" position, the function space 71 of the braking force amplifier 66 is blocked from the pressureless storage container 74 of the auxiliary pressure source 44 by function control valve 68, and instead is connected to communicate via control line 77 and the throughflow duct 78 of the function control valve 68 with the drive pressure space 42 of the braking force amplifier so that the output pressure $P_{BKV}$ of the proportional valve 43 is now also applied to the left side of the amplifier piston 37. Accordingly, the force $K_R$ now acting on the amplifier piston 37 acts in the opposite direction (see direction arrow 79 of FIG. 1), as a result of which a displacement movement, in the sense of an enlargement of the volumes of the output pressure spaces 23 and 24 of the main cylinders 21 and 22 (producing a braking pressure reduction in the connected braking circuits 1 and II) is imparted to the amplifier piston 37, along with rocker 57 due to the effect of the piston restoring springs 81 and 82 of the main cylinders 21 and 22 acting on their pistons 26 and 27, which displacement movement occurs against the operating force acting on the brake pedal 18.

The prerequisite, which is necessary for such a controllability of pressure reduction phases of the anti-blocking control system, is that the force $K_R$, acting on the amplifier piston 37 in the sense of a braking pressure reduction in the excited position I of the function control valve 68 be given by the relation $$K_R = F_2 \times P_{BKV}$$

and that $K_R$ be greater than the operating force multiplied by the pedal transmission against which the pressure reduction displacement of the amplifier piston 37 is applied. This can be easily fulfilled by suitably dimensioning the amplifier piston 37 within the framework of constructionally advantageous dimensional relationships, and with the constraint that the output pressure level $P_A$ of the auxiliary pressure source 44 is sufficiently high.

This auxiliary pressure source 44 contains a pressure reservoir 86 which can be charged by means of a reservoir charging pump 83 via a pressure responsive non-return valve 84. The reservoir pressure $P_A$ present at the output of the auxiliary pressure source 44 is monitored by means of a pressure sensor 87 which triggers a signal causing the activation of the reservoir charging pump when the reservoir pressure drops below a predetermined threshold valve. Furthermore, a pressure limiting valve 89 is connected between the high pressure output 88 of the reservoir charging pump and the pressureless storage container of the auxiliary pressure source 44 via branch 76($a$) and return line 76. Limiting valve 89 thus controls the opening pressure of the maximum output pressure level $P_A$ of the auxiliary pressure source 44.

Within the framework of the auxiliary pressure source 44, an electrically drivable safety valve 91 is also provided which is constructed as 2/4-way solonoid valve. In the basic "0" position of this safety valve 91, a flow path 92 leading from the function space 71 of the braking force amplifier 36 to the pressureless storage container 74 of the auxiliary pressure source 44 (via: the safety valve 91, branch 76($a$) and return line 76) is released while a flow path 93 leading from the high-pressure output 88 of the reservoir charging pump 83 to the storage container 74 of the auxiliary pressure source 44 is blocked. In the excited "I" position, the safety valve 91 blocks the flow path 92 leading from the function space 71 to the storage container 74 of the auxiliary pressure source 44 and opens the flow path 93 leading from the high-pressure output 88 of the reservoir charging pump 83 to the storage container 74 of the auxiliary pressure source 44 via branch 76($a$) and return line 76.

The safety valve 91 is driven into its excited "I" position when and as long as the anti-blocking control system 60 is activated, so that the effect of the throttle 72 of the ABS control valve can be utilized for limiting the rate of pressure increase, generally for metering the braking pressure for pressure build-up phases occurring during an anti-blocking control cycle. For terminating an an anti-blocking control, which is normally a pressure build-up phase, the ABS control valve which was already switched back to its basic "0" position and the safety valve 91 also assume its basic "0" position for terminating the pressure build-up. This ensures that the flow path 92 leading from the function space 71 of the braking force amplifier 36 to the storage container 74 of the auxiliary pressure source 44 provides for the pressure reduction in the function space 71, and thus braking is possible via both braking circuits I and II. This is true even if the pedal force operates without the booster. Even in the case of malfunction, where the ABS control valve is hung up in its excited "I" position with the amplifier piston 37 and pistons 26 and 27 of the main cylinders 21 and 22 pushed back to their initial positions and held there, the braking pedal 18 can be operated to control braking. Furthermore, the pressure reservoir 86 of the auxiliary pressure source 44 can be charged via the return valve 84 in the basic "0" position of the two valves 91 and 68.

The electric control signals required for driving: the ABS control valve 68, the braking pressure control valves 63, 64 and 66 and the safety valve 91 in conformance with control requirements are generated by the electronic control unit 67 of the ABS 60 from a comparative, and/or differentiating, processing of the output signals of wheel speed sensors 94, 96 and 97, which emit electric output signals characteristic of the circumferential wheel speeds of the vehicle wheels. One wheel speed sensor 94 and 96 each is allocated to each of the front wheels while the wheel speed sensor 97 is jointly allocated to the two rear wheels and emits an output signal which is characteristic of a mean value of the circumferential wheel speeds of the rear wheels, the inference being that the rear wheels of the vehicle are the driven vehicle wheels.

It is also assumed that the electronic control unit 67 processes the said drive signals, where these relate to the control of pressure reduction, pressure build-up and pressure holding phases of the anti-blocking control system, in accordance with known criteria for one skilled in the art, and thus the electronic circuit details of the electronic control unit 67 has been omitted as not necessary for an understanding of the invention.

For the braking system 10 in FIG. 1, a braking force distribution to the front axle and the rear axle is obtained, at least while the ABS 60 has not become effective, in the sense of a permanent balancing of the $F_{VA}/F_{HA}$ ratio of the front axle braking force $F_{VA}$, which can be exerted overall over the front wheel brakes 11 and 12 and of the braking force $F_{HA}$ which can be exerted overall by means of the rear wheel brakes 13 and 14. Such a permanent balancing must be effective under relevant safety aspects to ensure stable braking behavior of the vehicle within the entire range of vehicle decelerations which can be achieved by means of the braking system 10. That is, the rear wheels of the vehicle cannot lock before the front wheels during a braking action.

Figure 2:
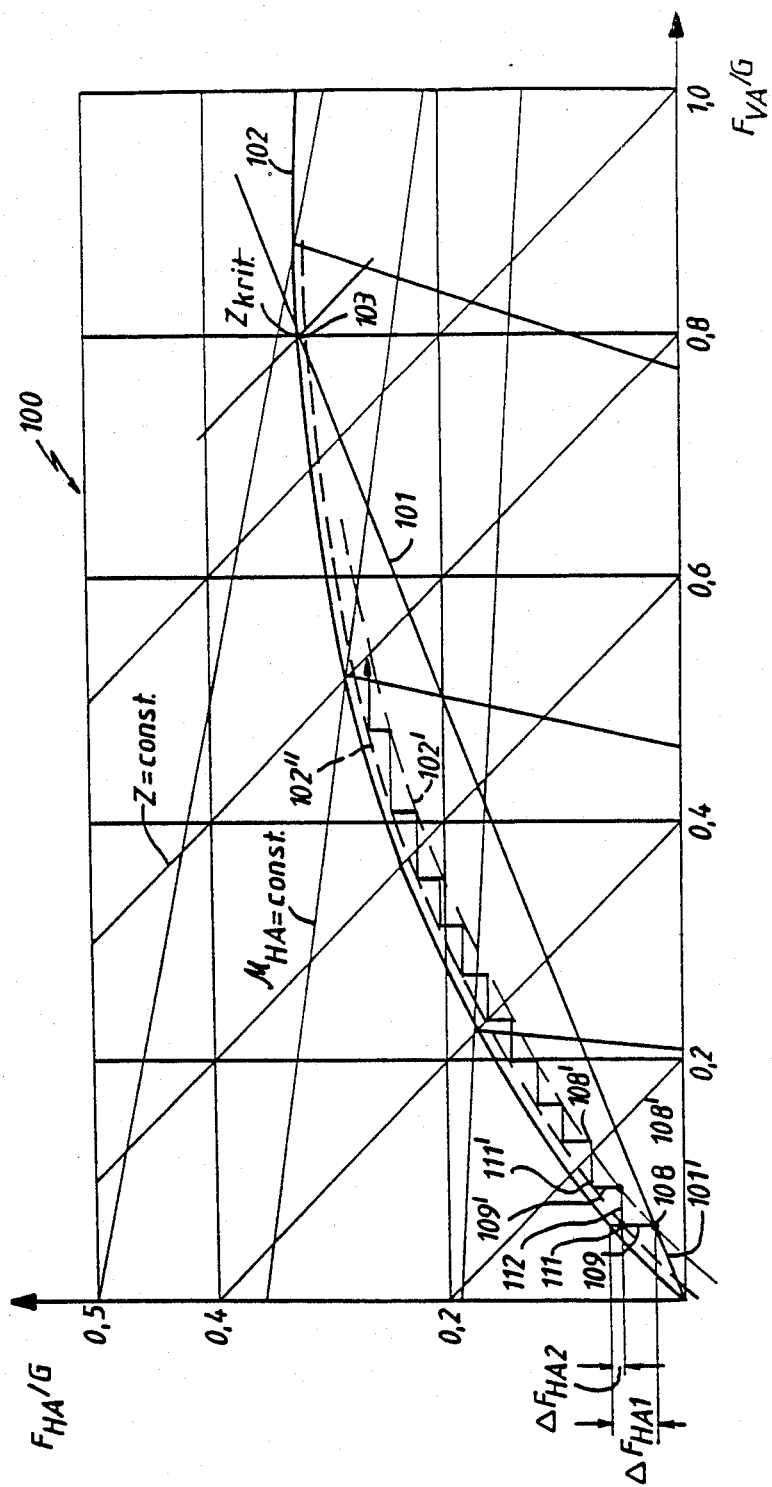
FIG. 2 shows a braking force distribution diagram to explain the operation of the braking system according to FIG. 1.

In the braking force diagram 100 of FIG. 2, a parabola 102 indicates the ideal braking force distribution which is intersected by straight line 101 representing the installed braking force distribution at a point 103, which point represents a critical vehicle deceleration $Z_{crit}$, with the addition of a safety margin of some percent of the highest possible practically achievable vehicle deceleration with a maximum operating force of the braking system and optimum adhesion force coefficients ($\mu=1$) between the roadway and the braked vehicle wheels. This corresponds to a braking force distribution which is stable and which can be achieved by a suitable design of the braking device 19 in conjunction with the dimensioning of the wheel brakes 11 to 14. In the braking force distribution diagram 100, the front axle braking force component $F_{VA}/G$ (referenced to vehicle weight G) is the abscissa, and the rear axle braking force component $F_{HA}/G$ is the ordinate. The diagonal lines represent equal braking forces between front and rear wheels; i.e., $F_{VA}/G$ equals $F_{HA}/G$. The parabola 102 represents those dynamic deceleration states of the vehicle which are linked to equal adhesion force factor at the front axle and the rear axle. This braking force distribution is ideal because it provides the highest safe and stable vehicle deceleration, with a predetermined limitation of the tangential force transmission, for example due to bad road conditions with low adhesion force coefficients ($\mu$).

The parabola 102 marks the values of the range of stable braking force distributions, those below the parabola 102 and the abscissa of the diagram 100, and the value range of the unstable braking force distributions, those above the parabola 102. In this connection, "unstable" means that, whenever the braking forces are increased in the sense of an increasing vehicle deceleration, the adhesion force coefficient ($\mu$) limiting the transferability of this braking force at the rear axle of the vehicle is first reached or exceeded and, therefore, a locking tendency also occurs first at the rear axle, with the consequence that the vehicle swings out. In the stable value range of the diagram 100 a locking tendency first occurs at the front axle and the vehicle remains dynamically stable even if the front wheels are locked.

It can be directly seen from diagram 100 that due to an installed braking force distribution (straight line 101), particularly in the range of low to medium vehicle decelerations or the so-called part braking range, the rear axle is utilized for braking the vehicle to a much lesser extent than would be the case if the ideal equal braking force distribution could be utilized. With a braking Z of 0.4, for example, the front axle braking force component in accordance with the installed braking force distribution (straight line 101) is about 0.28 and the rear axle braking force component is 0.12. With complete utilization of the ideal braking force distribution (parabola 102), one obtains a front axle braking force component of 0.28, a rear axle braking force component of 0.2, i.e., a vehicle deceleration of 0.48 could be achieved without loss of stability, which would thus be higher by 20% than the vehicle deceleration achieved with the installed braking system 10.

To achieve a higher value of the rear axle braking force component compared with the permanently installed braking force distribution 101, the braking system 10 according to FIG. 1 is provided with a control device which, utilizing functional elements of the ABS 60 and electronic processing of the output signals of the position transmitters 31 and 32, provides the possibility for changing the braking force distribution in the sense of increasing the rear axle braking force component. This control device comprises a processing unit 104 which is provided within the framework of the electronic control unit 67 of the ABS 60.

During an actuation of the braking system 10 according to FIG. 1, the pressure $P_{VA}$ in the output pressure space 23 of the main cylinder 21 of the front axle braking circuit I and the pressure $P_{HA}$ in the output pressure space 24 of the main cylinder 22 of the rear axle braking circuit II are both monotonic functions of the positions of the main cylinder pistons 26 and 27, respectively. Hence, the output signals of the position transmitters 31 and 32, for which a linear relationship exists between the respective piston positions $S_{KVA}$ and $S_{KHA}$, respectively, are also monotonically related to the pressures $P_{VA}$ and $P_{HA}$ prevailing in the output pressure spaces 23 and 24 of the main cylinders 21 and 22. In this connection, "piston positioning" $S_{KVA}$ and $S_{KHA}$ is understood to be the deflection of the pistons 26 and 27 from their basic position when the respective output pressure spaces 23 and 24 are pressureless.

Figure 3:
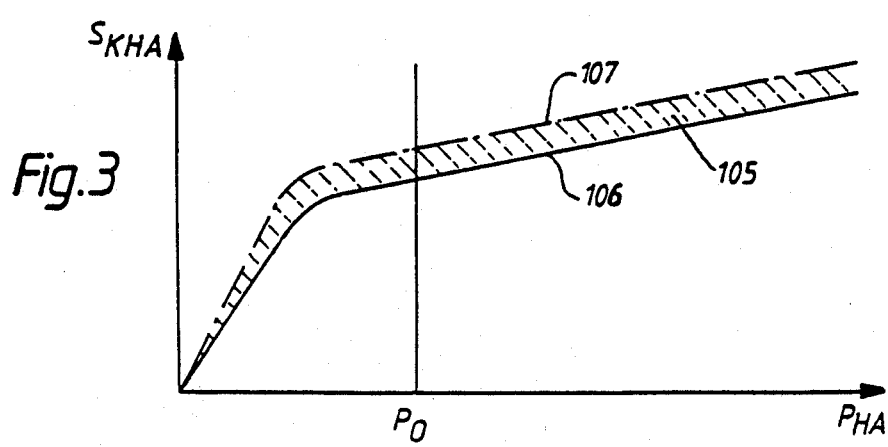
FIG. 3 shows a diagram for explaining the relationship between the output pressures of the main cylinders of the braking device of the braking system according to FIG. 1 and the transmitter output signals provided for detecting the piston positions.

This relationship is non-linear overall, as can be seen from the diagram shown in FIG. 3, which shows the relationship between the rear axle output pressure $P_{HA}$ (braking circuit II) plotted as abscissa, and the piston position $S_{KHA}$ plotted as ordinate. However, starting from a threshold value $P_O$, their relationship is linear towards higher values of the output pressure $P_{HA}$ and of the piston deflection $S_{KHA}$. Regardless of this, however, a clear relationship between the piston position $S_{KHA}$ and the output pressure $P_{HA}$ is given within the entire range of variations of the output pressure $P_{HA}$ within the framework of the shaded scattering range 105 due, for example, to friction effects. The lower limit of this range is marked by the continuous line 106, and the upper limit is marked by the dash-dot line 107. Hence, the output signals of the position transmitter 32 of the rear axle main cylinder 22, with the slight restriction resulting from the said scattering, can be evaluated in units of the output pressure $P_{HA}$ and thus in units of the rear axle braking force component $F_{HA}$.

This relationship applies analogously to the output signals of the position transmitter 31 of the main cylinder 21 of the front axle braking circuit I, since the braking system 10 is designed in such a manner that the front axle braking pressure (the output pressure $P_{VA}$ of the main cylinder 21) is equal to the rear axle braking pressure, the output pressure $P_{HA}$ of the main cylinder 22 when the ration $P_{VA}/P_{HA}$ corresponds to the installed braking force distribution $F_{VA}/F_{HA}$ represented by the straight line 101 of diagram 100 of FIG. 2.

As a first simple principle, control of the braking force distribution is possible, by means of the processing unit 104 of the electronic control unit 67 of the ABS 60 and its braking pressure control valves 63 and 64 associated with the front axle braking circuit I, in such a manner that, compared with the installed permanently balanced braking force distribution represented by the straight line 101 of the diagram 100 of FIG. 2, an increased rear axle braking force component $F_{HA}$ becomes utilizable in the part braking range. It is initially assumed that the parabola 102 of the ideal braking force distribution shown in FIG. 2 is applicable for the vehicle and that the dependence of the position transmitter output signals on the braking pressures $P_{VA}$ and $P_{HA}$ corresponds to the diagram of FIG. 3 which is easily possible due to the constructional design of the position transmitters 31 and 32 and of the braking system 10 overall. Furthermore, it is assumed that the parabola 102 of this ideal braking force distribution is stored in the processing unit 104 in a form suitable for continuous comparison with the front axle associated position transmitter output signals, either stored in the form of a series of fixed value pairs or continuously calculated in dependence on the level of the output signal of the position transmitter 31 allocated to the front axle braking circuit I, which determines or represents the front axle braking force component $F_{VA}$.

The processing unit 104 recognizes from the position transmitter output signals, the braking force distribution instantaneously given during a braking operation, which begins with the start of braking and follows with a continuous increase in the force while the driver operates the brake pedal 18, from an origin 0,0 of the braking force distribution diagram 100 along the straight line 101 of the installed permanently balanced braking force distribution. The processing unit 104 continuously compares, during this initiating phase of braking, the rear axle braking force component $F'_{HA}$, detected by means of the position transmitter 32 of the rear axle main cylinder 22, with the value of the rear axle braking force component $F_{HA}$ which is ideal for a comparable front axle braking force component and Which is linked for the front axle braking force component $F'_{VA}$ which is tracked by means of the output signal of the position transmitter 31 of the front axle braking circuit I. The processing unit 104 generates, when the measured value $F'_{HA}$ of the rear axle braking force component is less by more than a threshold value $F_{HA1}$ of the ideal value $F_{HA}$, an output signal by means of which the two braking pressure control valves 63 and 64 of the front axle braking circuit I are driven into their blocking "1" positions. This is the case at point 108 of FIG. 2, wherein the actuating force is being further increased, at which point the rear axle braking force component $F'_{HA}$ for the first time differs by the said threshold value $F_{HA1}$ from the rear axle braking force component $F_{HAi}$ characteristic for parabola 102 of the ideal braking force distribution during a braking operation. Previous to this point 108, the braking force distribution had developed along the section 101' starting from the origin of the coordinates of diagram 100. From this point 108 onward, an increase of the actuating force leads to an increase in the rear axle braking force component $F'_{HA}$ along the straight line 109 extending in parallel with the ordinate of the diagram 100; i.e., the braking pressure is increased at the rear wheel brakes 13 and 14 while the braking pressure is kept constant at the front wheel brakes 11 and 12.

As soon as the rear axle braking pressure or the rear axle braking force component $F'_{HA}$ (represented by the output signal of the position transmitter 32) has reached or exceeds a value (which is less by less than a threshold value $F_{HA2}$), than the threshold value $F_{HA1}$, of the ideal rear axle brake force component $F_{HAi}$, characteristic of the kept constant front axle braking force component $F'_{VA}$, the point 111 is reached. At point 111, the two braking pressure control valves 63 and 64 of the front axle braking circuit I are switched back to their basic "0" position so that braking pressure can now be built up at the front axle. At the same time, the braking pressure control valve 66 of the rear axle braking circuit II is driven to its blocking "1" position at which the pressure prevailing in the rear wheel brakes is held at its previously reached value. If during this process the brake actuating force is further increased, the braking force distribution now develops from point 111 along a straight line 112 extending in parallel with the abscissa of the diagram 100 until a braking force distribution, at which the measured rear axle braking force component $F'_{HA}$ is less (by the threshold value $F_{HA1}$) than the ideal value referred to the held front axle braking force component $F'_{VA}$, is reached, point 108'.

As the braking force distribution corresponding to point 108' of diagram 100 of FIG. 2 is reached, the braking pressure control valves 63 and 64 of the front axle braking circuit I and the braking pressure control valve 66 of the rear axle braking circuit II are again driven into the blocking position or open "1" position whereupon, with a further increase in the actuating force, the braking force distribution develops along the vertical straight line 109' extending parallel to the ordinate of the diagram 100 until a braking force distribution is again reached at point 111'. At this time, the rear axle braking force component $F'_{HA}$ again only differs by the smaller difference amount $\Delta F_{HA2}$ from the ideal value whereupon the braking pressure control valves 63 and 64 of the front axle braking circuit I are again driven to their open "0" positions, and the rear axle braking pressure control valve 66 is again switched back to its blocking "1" position, and so forth. As a result, the braking force distribution, while the actuating force is continuously being increased, develops as a step function between two parabolas 102' and 102'', one of which parabola 102' extends, according to the representation of FIG. 2, at a vertical distance of the value $\Delta F_{HA1}$ from the parabola 102 of the ideal braking force distribution and in parallel therewith. The other parabola 102'', follows the parabola 102 of the ideal braking force distribution at the smaller distance $\Delta F_{HA2}$.

The gain in braking effect, which can be achieved by the braking force distribution $F'_{VA}/F'_{HA}$ controlled in this manner, compares favorably with the ideal braking force distribution shown by parabola 102 and the permanently installed braking force distribution according to straight line 101. This provides for braking, greater by an amount which corresponds to the difference of the areas limited by the step function. As can be directly seen from a comparison of these areas, for example between abscissa values 0.2 and 0.4, the gain in braking effect which can be achieved by means of the braking force distribution control explained above is considerable. Naturally, the parabolas 102' and 102'' are also stored in the processing unit 104 in a form suitable for the comparison with the measured values of the front axle and the rear axle braking force component.

A similar development of the braking force distribution is obtained if the braking pressure control valve 66, allocated to the rear axle braking circuit II remains permanently in its pressure build-up position, the basic "0" position. That is, even when the braking pressure control valves 63 and 64 of the front axle braking circuit I assume their pressure build-up position. However, the consequence of this is that after a pressure holding phase at the front axle, at the instant at which the braking pressure control valves 63 and 64 of the front wheels brakes 11 and 12 are again driven to their open position, the rear axle braking pressure $P_{HA}$ drops slightly since a pressure equalization between the rear axle main cylinder 22 and the front axle main cylinder 21 can take place via action by the rocker 57.

To compensate for this dropping pressure, the pressure $P_{VA}$ in the output pressure space of the main cylinder 21, of the front axle braking circuit I is caused to increase faster when the braking pressure control valves 63 and 64 are in the open "0" position.

In addition, the rear axle braking pressure is also increased at the same time as the front axle braking pressure. Thus, instead of a stair-step-shaped development of the braking force distribution, a sawtooth-shaped development of the latter is obtained a is additionally illustrated in the detailed representation of FIG. 2a for the range between abscissa values 0.2 and 0.4.

In this type of braking pressure distribution control, the braking force distribution develops between the phases represented by the straight line sections 109' extending parallel to the ordinate, during which only the braking pressure at the rear axle is increased, along straight line sections 101'' extending obliquely; i.e., in approximate parallelism with the straight line 101 of the installed braking force distribution. Compared with the type of braking force distribution control represented in FIG. 2, fewer switch-over processes are needed for keeping the braking force distribution within the range of the braking force distribution bounded by the two parabolas 102' and 102''. This is true because the previous horizontal path 112 now has an upward component along line 101'. However, reductions in vehicle deceleration, which can impair the driving comfort, can occur for a short time when the front axle braking pressure control valves 63 and 64 are switched over to their open position.

Figure 4:
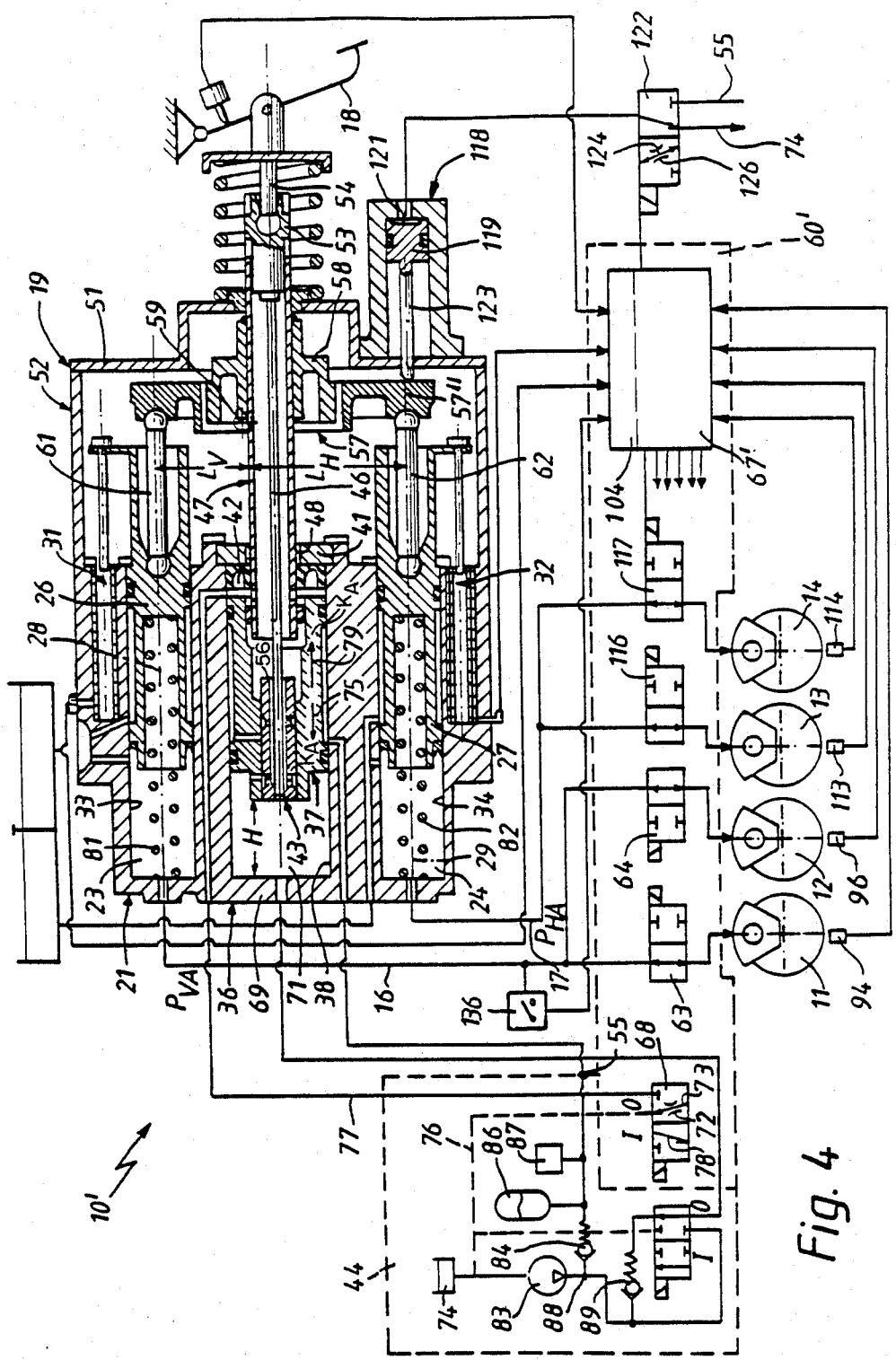
FIG. 4 shows a further illustrative embodiment of a dual-circuit braking system according to the invention, for a vehicle which is also equipped with a propulsion control device ASR, with a braking force distribution control arrangement operating in accordance with the principle of intermittent increasing of the rear axle braking pressure.

The embodiment according to FIG. 4 shows a further refinement according to which an increased braking force component can be utilized compared with an installed braking force distribution made in the sense of a permanent balancing. In noting the operation of FIG. 4, only the differences from FIG. 1 will be highlighted.

FIG. 4 shows a dual-circuit braking system 10' for a vehicle which is equipped both with an ABS 60 and with a device for propulsion control ASR. In this context, it is assumed for the purpose of the explanation that the vehicle has a rear axle drive and that the propulsion control device operates in accordance with the principle of decelerating a vehicle wheel which tends to spin, by activating its wheel brake 13 or 14 to such an extent that its drive slip remains within a range of values which is compatible both with good propulsion acceleration and with good driving stability. In this case, the ABS 60' is constructed as a so-called four-channel ABS in which one wheel speed sensor 113 and 114 is provided for each driven vehicle wheel and a separate braking pressure control valve 116 and 117 is allocated to each of the driven vehicle wheels. The ABS 60' is also designed in such a manner that individual braking pressure control is possible at each of the rear wheel brakes 13 and 14 of the vehicle.

To the extent to which constructional and functional elements of the braking system 10' and of its ABS 60' have the same reference symbols in FIG. 4 as in FIG. 1, it is intended to refer to the relevant parts of the description relating to FIG. 1.

Within the framework of the propulsion control device, in the braking system 10' according to FIG. 4, a drive cylinder 118 is placed against the cover 51 of the housing 52 of the braking device 19 to provide a drive pressure space 121 which is movably limited by a drive piston 119 connected via a control valve (ASR control valve) 122 of the propulsion control device 67 to the pressure output 55 of the auxiliary pressure source 44. The drive piston 121 of the drive cylinder 118 is provided with a piston plunger 123 which passes through an opening 124 of the housing cover 51 and is supported on the rocker arm 57'' associated with the rear axle main cylinder 22. The drive cylinder 118 is arranged in such a manner that its central longitudinal axis, along with that of the piston plunger 123, coincides with the central longitudinal axis 29 of the rear axle main cylinder 22.

The ASR control valve 122 is constructed as 2/3-way solonoid valve and shown in the basic "0" position in which the drive pressure space 121 of the drive cylinder 118 is connected to the pressureless storage container 74 of the auxiliary pressure source 44 via line 74(a), and is blocked off from its output 55. In the excited "I" position of the ASR control valve, the drive pressure space 121 of the drive cylinder 118 is connected to the pressure output 55 of the auxiliary pressure source 44 and blocked from its storage container 74. The flow path 124 of the ASR control valve 122, which conveys the connection of the pressure output 55 of the auxiliary pressure source 44 to the drive pressure space 121 of the drive cylinder 118 in the excited "I" position, is provided with a throttle 126 which limits the rate of pressure increase in the drive pressure space 121 of the drive cylinder 118 to a desired value.

To achieve braking pressure build-up phases of the propulsion control system, the ASR control valve 122 is driven to its excited "I" position when no trend to spinning is present and the braking pressure control valve 116 or 117 of the rear wheel brake 13 or 14 are driven into their blocking "I" positions.

A braking pressure holding phase occurs at the wheel brake 13 and/or 14 by the propulsion control 67' in that braking pressure control valve 116 or 117, respectively, is driven to the pressure holding position—the blocking "0" position, while the ASR control valve 122 is driven to its braking pressure build-up "I" position. Pressure reduction phases are achieved in that control 67' moves the ASR control valve 122 back to its basic "0" position and the braking pressure control valve 116 and/or 117 (of the rear wheel brake 13 and/or 14 at which the braking pressure is to be reduced) is also switched back to its basic "0" position.

Figure 2A:
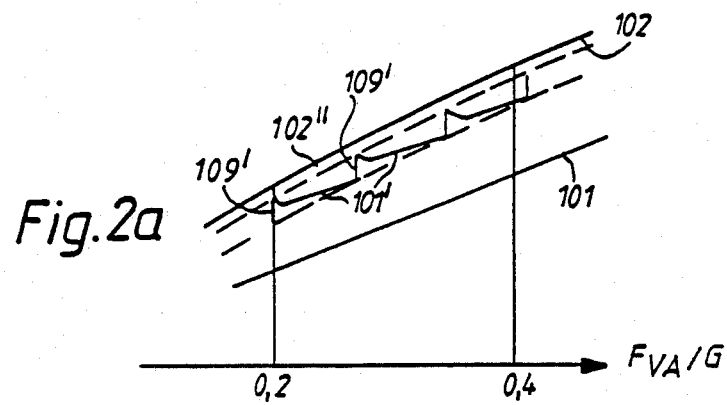
FIG. 2a shows a section of the diagram according to FIG. 2 to explain a variant of the braking distribution control arrangement.

The drive cylinder 118 associated with the rear axle braking circuit II of the propulsion control device and the braking pressure control valves 116 and 117 provided within its framework are controlled by output signals of the processing unit 104 and the electronic control unit 67' of the anti-blocking and propulsion control device, for a control which is similar to the previously explained types of braking force distribution control found at FIG. 2a. The embodiment of FIG. 4 is explained with reference to the diagram of FIG. 2b, as follows.

Whenever the processing unit 104 recognizes from the output signals of the position transmitters 31 and 32 that the rear axle braking force component or output pressure of the main cylinder 22 of the rear axle braking circuit II, linked to the respective front axle braking force component, differs by more than the value $\Delta F_{HA1}$ from the ideal value $F_{HAi}$, the ASR control valve 122 is switched to its excited "I" position. As a result, the output pressure of the auxiliary pressure source 44 is applied to the drive pressure space 121 of the drive cylinder 118 by virtue of ASR valve 122 connecting line 55 via restricter 126 to space 121. As a result, an additional force is exerted on the righthand side of piston 27 of the rear axle main cylinder 22 which causes a displacement of the piston 27 in the sense of an increasing of the rear axle braking pressure $P_{HA}$. This causes an increase in the braking force distribution, while the drive piston further increases the actuating force, to cause the force to follow along a steeply increasing branch 127 of the curve representing the development of the brake force distribution. When a point 129 of the parabola 102" is reached, a braking force distribution is reached at the rear axle braking force component, which only differs by the difference amount $\Delta F_{HA2}$ from the value $F_{HAi}$ corresponding to the parabola 102 of the ideal braking force distribution. As soon as this is the case, the ASR control valve 122 is switched back into its basic "0" position and, at the same time, the braking pressure control valves 116 and 117 are also driven to their blocking "I" positions so that the braking pressure $P_{HA}$, coupled to the rear wheel brakes 13 and 14 is held at the value reached at the time of the switchover of the said valves 122 and 116 and 117. During a further increase of the actuating force, the braking force distribution then develops along the section 131 of the curve 128, which section is substantially parallel to the abscissa of the diagram of FIG. 2b until this section 131 intersects point 132. Here, parabola 102' extends below the parabola 102 of the ideal braking force distribution by the difference amount $\Delta F_{HA1}$.

Figure 2B:
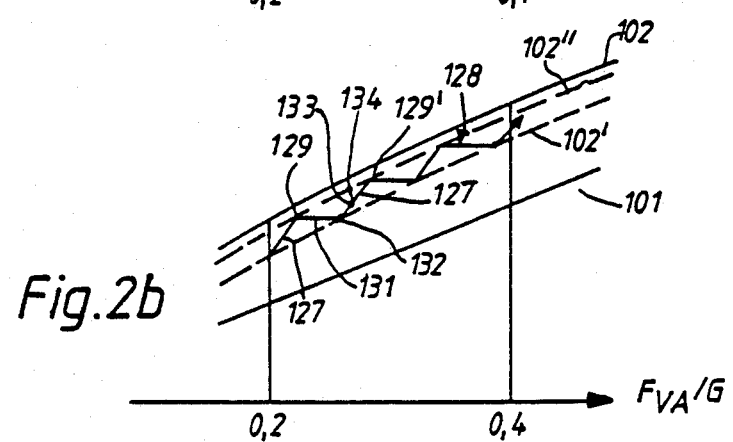
FIG. 2b shows the same section of the braking force distribution diagram to explain a further variant of the braking force distribution control arrangement.

As the braking force distribution point 132 is reached, the rear braking force control valves 116 and 117 of braking circuit II are driven back to their basic "0" position and the ASR control valve 122 is driven back to its pressure build-up excited "I" position, with the consequence that the braking pressure in the rear axle braking circuit II is increased in accordance with the further steeply rising branch 127' of the curve 128 of FIG. 2b with the braking force distribution developing accordingly until it reaches the point 129' of the parabola 102", at which the rear axle braking force component only differs by the value $\Delta F_{HA2}$ from the ideal value $F_{HAi}$. At point 129', a phase of the braking force distribution control is again initiated at which, with the rear axle braking force component being held constant, the front axle braking force component alone is increased until the difference of the instantaneous value of the rear axle braking force component detected by means of the position transmitter 32 has again increased from the ideal value to the amount $\Delta F_{HA1}$ and so forth.

This type of braking force distribution control effects an increase in the rear axle braking force component to an almost ideal value even when the drive piston no longer increases the actuating force immediately after the switch-over of the ASR control valve 122 and of the braking pressure control valves 116 and 117 to the pressure build-up position; i.e., the actuating force is held constant at a time corresponding to point 133 in the diagram of FIG. 2b. The rear axle braking force component is then increased with a constant front axle braking force component until the rear axle braking force component corresponds to the value represented by point 134 of the parabola 102", as a result of which a correspondingly increased value of the rear axle braking force component becomes utilizable.

Reference is made again to the diagrams of FIGS. 2 and 3 to explain further important aspects which are of equal importance for all variants of the braking force distribution control previously explained.

First, the braking force distribution control presupposes for each of its variants explained above, accurate knowledge of the parabola 102 of the ideal braking force distribution which is determined for the respective vehicle, and with reference to which the threshold values for the parabolas 102' and 102" marking the control can then be determined.

Of the parameters determining the variation of the parabola 102 of the ideal braking force distribution in diagram 100, namely the wheel base 1, the height of the center of gravity h above the road surface, the rear axle load component $\psi$ and the vehicle weight G (which the front axle braking force component $F_{VA}$, the rear axle braking force component $F_{HA}$ and the braking Z of the vehicle are referenced), only the wheel base 1 is independent of the vehicle loading and its distribution in the vehicle, while the parameters h, $\psi$ and G can in some cases vary considerably with the occupancy or loading of the vehicle, particularly the rear axle load component $\psi$ and the total vehicle weight G. However, these quantities can be determined in many ways and utilized by suitable processing in the processing unit 104 for determining the vehicle-specific variation of the parabola of the ideal braking force distribution. For this purpose, a number of illustrative possibilities can be utilized as an alternative, or in combination, to obtain values for these quantities.

These are:

(1) The processing unit 104 is programmable to the extent that the driver can enter which vehicle seats are occupied and can estimate the weight of the material located in the luggage space of a passenger vehicle. The empty weight $G_O$ of the vehicle is assumed to be known.

These inputs than produce the total weight G of the vehicle and, in good approximation, the height of the center of gravity h and the rear axle load component $\psi$.

(2) The vehicle can be equipped with sensors which, with a stational vehicle, enable the loading condition of the vehicle to be detected so that both the total weight G of the vehicle and the rear axle load component $\psi$ can be recognized. On the basis of the fact that the height of the center of gravity only insignificantly depends on the loading condition of the vehicle, the processing unit 104 can then calculate a parabola 102 which corresponds to the actually valid ideal braking force distribution in a very good approximation.

(3) The total weight G of the vehicle can be determined in a simple manner, virtually dynamically, from a measurement of the braking pressure $P_{VA}$ and $P_{HA}$, or of the front axle braking force component and of the rear axle braking force component with the aid of the position transmitters 31 and 32. Vehicle deceleration can be obtained from an evaluation of the output signals of the wheel speed sensors 94 and 96 of the front axle braking circuit I, and/or of the output signals of the wheel speed sensor 97 (or 113 and 114) of the rear axle braking circuit II.

(4) The vehicle weight can be determined dynamically from the output signals of the wheel speed sensors 94 and 96 of the front axle braking circuit I, and/or 97 and 113 and 114 of the rear axle braking circuit II, and the instantaneous vehicle acceleration and comparing this with the acceleration which is produced in accordance with the propulsion torque which can be recognized from the characteristic data of the engine, e.g., speed of the engine and position of the throttle valve of an internal combustion engine and engaged gear stage of the gear transmission provided for transmitting the drive torque to the driven vehicle wheels. The latter can be monitored from the drive shafting of the vehicle.

The dynamic possibilities of determining the vehicle weight specified at (3) and (4), supra, presuppose that the absolute amounts of the output signal levels of the position transmitters 31 and 32 are a measure of the front axle braking pressure $P_{VA}$ and the rear axle braking pressure $P_{HA}$.

To be able to achieve a relevant calibration of the position transmitters 31 and 32, a pressure switch 136 is provided in the braking system 10 and 10' (FIG. 1 and FIG. 4). When the braking system 10 is actuated, with a stationary vehicle, the control 10, 10' will emit an output signal as soon as the braking pressure $P_{VA}$ in the front axle braking circuit exceeds a defined threshold value $P_{VAO}$ predetermined by the design or setting of the pressure switch 136. The same also applies to the rear axle braking circuit II, at lease when the braking system 10 or 10' is actuated with the permanent balancing of the braking force distribution represented by the straight line 101 of the diagram 100 of FIG. 2, i.e., the braking force distribution control is not effective which should be the situation where the braking system is actuated with a stationary vehicle.

If the output signals of the position transmitters 31 and 32, assuming their identical construction, and which are linked to the particular threshold value $P_{VAO}$, differ only slightly; i.e., within a margin of 5% to 10% from one another, this is taken into consideration by the processing unit 104 by correspondingly changing the calibration factor with which the output signals of the position transmitters 31 and 32 determine the front axle and the rear axle braking pressures. If, however, the signal levels of the output signals of the two position transmitters 31 and 32 differ by more than an amount corresponding to a pressure magnitude difference $\Delta P$ of 20 bar, this is evaluated by the processing unit 104 to mean that the degree of venting in the braking circuit of the position transmitter 31 or 32 which indicates the greater piston stroke is bad and a visual or oral warning signal is triggered which indicates to the driver that the braking system 10 or 10' requires checking.

Furthermore, it is appropriate in the sense of stable braking behavior of the vehicle to keep the rear axle braking force component $F_{HA}$ relatively lower in curve driving/braking situations than in straight-ahead driving/braking situations to prevent the rear of the vehicle from braking loose in curved driving/braking situations.

To detect a curve driving situation, a transverse acceleration sensor can be provided. However, it is also possible to detect such a situation by means of the output signals of the various wheel speed sensors 94 and 96 and 113 and 114 associated with the various vehicle sides which generate output signals having a higher signal level for the vehicle side on the outside of the curve than for the vehicle side on the inside of the curve.

The processing unit 104 can also be constructed in such a manner that it is virtually capable of "learning" in such a manner that it determines from processing a number of the output signals of the position transmitters 31 and 32 and of the wheel speed sensor output signals (characteristic of the vehicle deceleration) and the output signals of the pressure switch 136, in an adaption process comprising several braking cycles, the parabola of the ideal braking force distribution characteristic of the vehicle and thus also the parabolas 102' and 102" between which the braking force distribution control is effected in the previously explained sense.

In addition, a brake slip-dependent control system can be superimposed on the braking force distribution control in such a manner that the brake slip of the rear wheels is adjusted to a value which at least corresponds to the brake slip of the front wheels, or is higher by up to 1%, even when the anti-blocking system is not activated. However, such a slip-dependent control system should only become effective from a minimum speed of the vehicle of, for example 30 km/h from which an adequate measuring accuracy of the wheel speed sensors and accordingly a good analysis of their output signals are ensured.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A hydraulic dual-circuit braking system for a road vehicle having front wheel and rear wheel brake means which are controlled by a front axle and a rear axle braking circuit means for supplying separate braking actuating pressures $P_{VA}$ and $P_{HA}$ to the front and rear wheel brake means in response to a pedal means applying a force via a braking force amplifier;

each braking circuit means including a main piston-cylinder means arranged in a common housing adjacent to one another in a twin-type construction and including a piston means;

a two armed rocker means having one of its arms connected to each piston means of the piston-cylinder means is provided to cause displacement of each piston means;

said rocker means is supported for displacement by an actuating force in the direction of displacement of the piston means and pivotable about an axis which extends vertically with respect to the displacement direction of movement of the piston means;

the rocker arms having a length $L_V$ and $L_H$ for the front and rear braking circuit means, respectively;

wherein a ratio $L_V/L_H$ of the effective lengths $L_V$ and $L_H$ of the rocker arms corresponds to a ratio of $F_H/F_V$, wherein $F_H$ and $F_V$ are affective piston areas of the respective main cylinder pistons;

said pedal means acting through said rocker means to provide a permanent balancing of a braking force distribution $F_{VA}/F_{HA}$, wherein $F_{VA}$ and $F_{HA}$ are the braking forces applied to the front and rear wheel brakes, respectively, for a dynamically stable braking behavior of the road vehicle in an entire range of variations of vehicle decelerations with highest adhesion-force coefficients between roadway and wheels of the vehicle;

an anti-blocking system means (ABS) having braking pressure actuator means driven by electric output signals of an electronic ABS control unit means;

said anti-blocking system means (ABS) operating to provide braking pressure holding phases at the front wheels of the vehicle, and including: one position transmitter means for each of the main cylinder pistons, for providing electric output signals of the respective piston positions as information inputs to a processing unit means provided within the electronic control unit means;

wherein said processing unit means evaluates the position output signals of the position transmitters means as indicative of the braking pressures $P_{VA}$ and $P_{HA}$ generated in the two main piston-cylinder means, as well as ideal front and rear axle braking force components $F_{HA}$ and $F_{VA}$ to produce braking force components $F'_{HA}$ and $F'_{VA}$ for the front and rear braking means, which are correlated to a particular vehicle deceleration Z;

said processing unit means comparing said rear axle braking force component $F'_{HA}$ with an ideal value component $F_{HAi}$ of the rear axle braking force component determined from measurement data of the vehicle when attempting to provide equal adhesion force closure at the front and rear brakes;

and wherein if the value component $F'_{HA}$ determined in this manner is lowered by more than a threshold value $F_{HA1}$ than the ideal value component $F_{HAi}$, said processing unit means triggers a signal which, in turn, triggers a braking pressure holding phase at the front axle brake to maintain the braking force at the front axle constant, while increasing the braking force at the rear brakes;

and wherein when the rear axle braking force component exceeds a value which is lower by less than a second difference threshold $F_{HA2}$, which is smaller than the first threshold value $F_{HA1}$, than the ideal value component $F_{HAi}$ of the rear axle braking force, said signal processing means releases the braking pressure holding phase at the front axle brake to allow the brake pressure at the front brake to increase.

2. A braking system according to claim 1, wherein a pressure switch means is provided to generate an output signal when the braking system is operated with the vehicle stationary and the pressure $P_{VA}$ generated in the front axle braking circuit exceeds a predetermined threshold valve $P_O$;

said output signal and the positions of the piston means in the main cylinder means through the position transmitter means are processed by the signal processing means to determine quantities which are characteristic of the installed braking force distribution;

and wherein said characteristics are then used by the signal processing means as a basis for the determination of the ideal component values.

3. A braking system according to claim 1, wherein the signal processing means contains a computer which determines ideal braking force component $F'_{HA}$ and $F'_{VA}$ distribution utilized for the comparison with the measured braking force while taking into consideration loading conditions of the vehicle.

4. A braking system according to claim 2, wherein the signal processing means contains a computer which determines ideal braking force component $F'_{HA}$ and $F'_{VA}$ distribution utilized for the comparison with the measured braking force while taking into consideration loading conditions of the vehicle.

5. A braking system according to claim 1, wherein the value $F_{HAi'}$ utilized for the comparison with the measured value of the rear axle braking force component, is lowered by a difference amount $\Delta F_{HAi}$ when a transverse acceleration acts on the vehicle which exceeds a predetermined threshold value.

6. A braking system according to claim 2, wherein the value $F_{HAi'}$ utilized for the comparison with the measured value of the rear axle braking force component, is lowered by a difference amount $\Delta F_{HAi}$ when a transverse acceleration acts on the vehicle which exceeds a predetermined threshold value.

7. A braking system according to claim 3, wherein the value $F_{HAi'}$ utilized for the comparison with the measured value of the rear axle braking force component, is lowered by a difference amount $\Delta F_{HAi}$ when a transverse acceleration acts on the vehicle which exceeds a predetermined threshold value.

8. A braking system according to claim 4, wherein the value $F_{HAi'}$ utilized for the comparison with the measured value of the rear axle braking force component, is lowered by a difference amount $\Delta F_{HAi}$ when a transverse acceleration acts on the vehicle which exceeds a predetermined threshold value.

9. A braking system according to claim 1, wherein at least one level transmitter means is provided to produce an output signal to the signal processing means which is a measure of longitudinal inclination of the vehicle chassis which deviates from a position of the chassis which is characteristic of minimum loading of the vehicle and is thus a measure of the rear axle load component on the vehicle to determine the ideal value component $F_{HAi}$.

10. A braking system according to claim 2, wherein at least one level transmitter means is provided to produce an output signal to the signal processing means which is a measure of longitudinal inclination of the vehicle chassis which deviates from a position of the chassis which is characteristic of minimum loading of the vehicle and is thus a measure of the rear axle load component on the vehicle to determine the ideal value component $F_{HAi}$.

11. A braking system according to claim 5, wherein at least one level transmitter means is provided to produce an output signal to the signal processing means which is a measure of longitudinal inclination of the vehicle chassis which deviates from a position of the chassis which is characteristic of minimum loading of the vehicle and is thus a measure of the rear axle load component on the vehicle to determine the ideal value component $F_{HAi}$.

12. A braking system according to claim 1, wherein the signal processing means determines from an evaluation of the operating data of engine speed, throttle valve position and gear transmission for transmitting propulsion torque from the engine to the vehicle wheels, the total vehicle weight and the axle load distribution from a comparison of this data with vehicle acceleration data detected by means of wheel speed sensors to be used to determine the ideal value component $F_{HAi}$.

13. A braking system according to claim 2, wherein the signal processing means determines from an evaluation of the operating data of engine speed, throttle valve position and gear transmission for transmitting propulsion torque from the engine to the vehicle wheels, the total vehicle weight and the axle load distribution from a comparison of this data with vehicle acceleration data detected by means of wheel speed sensors to be used to determine the ideal value component $F_{HAi}$.

14. A braking system according to claim 5, wherein the signal processing means determines from an evaluation of the operating data of engine speed, throttle valve position and gear transmission for transmitting propulsion torque from the engine to the vehicle wheels, the total vehicle weight and the axle load distribution from a comparison of this data with vehicle acceleration data detected by means of wheel speed sensors to be used to determine the ideal value component $F_{HAi}$.

15. A braking system according to claim 1, wherein vehicle acceleration is logically combined with the respective braking force distribution by the signal processing means for determining the total vehicle weight and the axle load distribution used to determine the ideal value component $F_{HAi}$.

16. A braking system according to claim 2, wherein vehicle acceleration is logically combined with the respective braking force distribution by the signal processing means for determining the total vehicle weight and the axle load distribution used to determine the ideal value component $F_{HAi}$.

17. A braking system according to claim 5, wherein vehicle acceleration is logically combined with the respective braking force distribution by the signal processing means for determining the total vehicle weight and the axle load distribution used to determine the ideal value component $F_{HAi}$.

* * * * *